(12) United States Patent
Golovin et al.

(10) Patent No.: US 8,404,318 B2
(45) Date of Patent: Mar. 26, 2013

(54) METHODS AND APPARATUS TO PRODUCE ALIGNED FILM OF LYOTROPIC CHROMONIC LIQUID CRYSTALS

(75) Inventors: Andrii B. Golovin, Kent, OH (US); Oleg Lavrentovich, Kent, OH (US)

(73) Assignee: Kent State University, Kent, OH (US)

( * ) Notice: Subject to any disclaimer, the term of this patent is extended or adjusted under 35 U.S.C. 154(b) by 94 days.

(21) Appl. No.: 12/802,896

(22) Filed: Jun. 16, 2010

(65) Prior Publication Data

US 2011/0017949 A1 Jan. 27, 2011

Related U.S. Application Data

(60) Provisional application No. 61/268,752, filed on Jun. 16, 2009.

(51) Int. Cl.
G02F 1/1337 (2006.01)
B05D 5/06 (2006.01)

(52) U.S. Cl. ......... 428/1.2; 349/124; 349/127; 349/132; 427/162

(58) Field of Classification Search .............. 252/299.01; 428/1.2; 427/162; 118/100; 349/124, 127, 349/132

See application file for complete search history.

(56) References Cited

U.S. PATENT DOCUMENTS

| | | |
|---|---|---|
| 2,400,877 A | 5/1946 | Dreyer |
| 2,544,659 A | 3/1951 | Dreyer |
| 5,596,434 A | 1/1997 | Walba et al. |
| 6,171,802 B1 | 1/2001 | Woolverton et al. |
| 6,245,255 B1 | 6/2001 | Helber et al. |
| 6,245,399 B1 | 6/2001 | Sahouani et al. |
| 6,411,354 B1 | 6/2002 | Lavrentovich et al. |
| 6,541,185 B1 | 4/2003 | Matsunaga et al. |
| 6,570,632 B2 | 5/2003 | Lavrentovich et al. |
| 6,645,578 B2 | 11/2003 | Sahouani et al. |
| 6,699,533 B2 | 3/2004 | Sahouani et al. |
| 7,294,370 B2 | 11/2007 | Lavrentovich et al. |
| 2006/0013956 A1 | 1/2006 | Angelescu et al. |
| 2006/0040069 A1* | 2/2006 | Lavretovich et al. .......... 428/1.2 |

OTHER PUBLICATIONS

Angelescu, Dan E. et al, "Macroscopic Orientation of Block Copolymer Cylinders in Single-Layer Films by Shearing", Advanced Materials, 2004 16, No. 19, pp. 1736-1740, Oct. 4.
Angelescu, Dan E. et al, "Shear-Induced Alignment in Thin Films of Spherical Nanodomains", Advanced Materials, 2005, 17, pp. 1878-1881.
Tiddy, G.J.T. et al, "Highly ordered aggregates in dilute dye-water systems", Langmuir, 1995, 11 (2), pp. 390-393, American Chemical Society.
Camorani P. et al, "Absorption spectra and chromonic phase in aqueous solution of perylenetetracarboxylic bisimides derivatives", Semiconductor Physics, Quantum Electronics & Optoelectronics 4, 229, 2001.

* cited by examiner

*Primary Examiner* — Shean C Wu
(74) *Attorney, Agent, or Firm* — Hahn Loeser & Parks, LLP; Scott M. Oldham (57) ABSTRACT

The present invention comprises a device and method for ordering molecules of lyotropic chromonic liquid crystals to aligned structure of a dried film. An example of an aligned film may be transparent to visible light but not transparent to polarized light in the ultraviolet and/or infrared portions of the electromagnetic spectrum. A shearing device having a shearing tool and a repelling pad may repel the solvent and provide a shear force to shear the LCLC dissolved in the solvent as a film on the surface of a substrate. A method of making an aligned lyotropic chromonic liquid crystal-based film comprises providing a mixture of a lyotropic chromonic liquid crystal material in a solvent for the liquid crystal material, applying the mixture to a substrate, shearing the lyotropic chromonic liquid crystal with a shearing device and removing the solvent to produce an aligned lyotropic chromonic liquid crystal-based film.

19 Claims, 10 Drawing Sheets
(9 of 10 Drawing Sheet(s) Filed in Color)

METHODS AND APPARATUS TO PRODUCE ALIGNED FILM OF LYOTROPIC CHROMONIC LIQUID CRYSTALS

CROSS-REFERENCE TO RELATED APPLICATIONS

This patent application claims the benefit of U.S. Provisional Patent Application No. 61/268,752 filed Jun. 16, 2009, the disclosure of which is expressly incorporated by reference herein.

FIELD OF THE INVENTION

This invention relates to aligned films prepared from lyotropic chromonic liquid crystals that are suitable for a variety of uses such as polarizing and optical compensating films for visible, ultraviolet and infrared parts of the electromagnetic spectrum. More particularly, this invention also relates to a shearing apparatus and methods to apply a shear force to lyotropic chromonic liquid crystal films in order to provide alignment properties.

BACKGROUND AND SUMMARY OF THE INVENTION

It is well known that there are three states of matter: solids, liquid and gases. There is, however, a special fourth state of matter referred to as the liquid crystals (LCs) or mesomorphic states, intermediate between the solids and liquids. In the LC state, the material possesses long-range orientational order of the constituent units (molecules or molecular aggregates) while the long-range positional order of these units is partially or completely lost. The intermediate character of order is responsible for high sensitivity of LCs to external factors, such as the presence of electromagnetic fields or interface with another medium and also for unique optical and structural properties used in a variety of applications, ranging from computer monitors and other types of visual display systems commonly referred to as liquid crystal displays or LCDs, to materials of superior tensile strength such as Kevlar. The development of new properties and improvement of previously known properties may expand the number of applications in which liquid crystal materials may be used. One of these properties is the alignment of liquid crystal material on a substrate.

LCs may be classified as thermotropic or lyotropic. Thermotropic LCs are orientationally ordered (or mesomorphic) within a specific temperature range. In contrast, lyotropic LC materials become mesomorphic when dissolved in a solvent (such as water) within an appropriate concentration range. The LC state occurs within an appropriate range of parameters such as temperature and concentration.

Lyotropic LCs are typically amphiphilic materials (surfactants) formed by molecules that have a polar (hydrophilic) head and a non-polar (hydrophobic) aliphatic tail. This dual character of the molecules leads to self-organization, for example, micelle formation, when they are dissolved in a solvent such as water or oil. When lyotropic LC molecules are in contact with a substrate, their amphiphilic nature generally results in a perpendicular orientation of the molecule with respect to the plane of the substrate. Either the polar head of the lyotropic LC is attracted to a polar substrate or the hydrophobic tail of a lyotropic LC molecule is attracted to a non-polar substrate. Either orientation results in a perpendicular alignment of the molecule with respect to the substrate. This perpendicular alignment means that the preferred orientation is the so-called homeotropic alignment, in which the optical axis (or director) is perpendicular to substrate. However, it can be difficult to align the surfactant-based lyotropic liquid crystal in a planar fashion where the director is in the plane of the solid substrate.

Figure 1A:
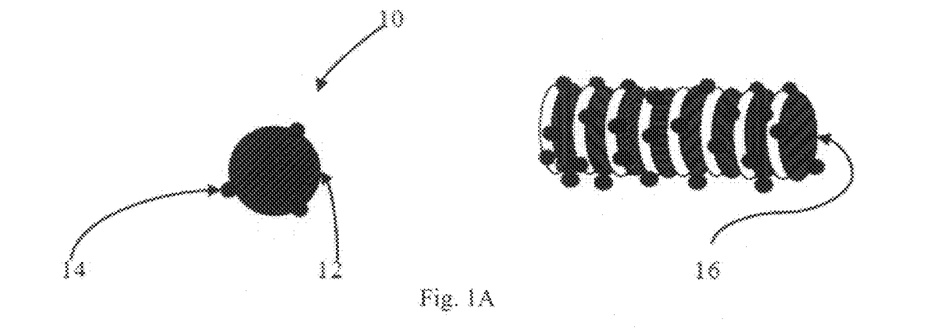
FIG. 1A is a representation of a single LCLC molecule.

Lyotropic chromonic liquid crystals (LCLCs) differ in their structure from conventional lyotropic LCs. Conventional lyotropic liquid crystals, also referred to as surfactants, are based on amphiphilic rod-like molecules with polar heads and hydrophobic alkyl chain tails. The term chromonic is a short hand expression for phrases such as "lyotropic mesophase formed by soluble aromatic mesogens." The term was additionally intended to carry connotations of dyes and chromosomes and of the bis-chromone structure of disodium cromoglycate (DSCG), also known as cromolyn, one of the first identified solutes that form LCLCs. The molecular and macrostructure of LCLCs, as shown in FIG. 1, are generally plank-like or disk-like rather than rod-like, rigid rather than flexible, and aromatic rather than aliphatic. The LCLC molecules 10 (FIG. 1A) have a relatively rigid plank-like or disc-like aromatic core 12 with polar solubilizing groups 14 at the periphery. Aggregation of these molecules, caused by face-to-face arrangement of aromatic cores, results usually in cylindrical stacks 16 with molecular planes being more or less perpendicular to the axis of the aggregate. The geometry of the basic structural unit in LCLCs is thus very different from the micelles, spherical or cylindrical, and bilayers formed by amphiphilic (surfactant) molecules in the regular lyotropic liquid crystals. The tendency to aggregate is observed even in very dilute solutions, thus LCLCs do not show a distinct threshold concentration similar to the critical micelle concentration in amphiphilic systems, except, perhaps, at the stage of dimer formation. In contrast to the closed micelles formed by many surfactants, the LCLC aggregates do not have a clearly defined size (length), as there is no geometric restriction to the addition of another molecule to the existing stack. Such a behavior, first observed in the studies of nucleic acid bases and nucleosides, is called "isodesmic."

Figure 1B:
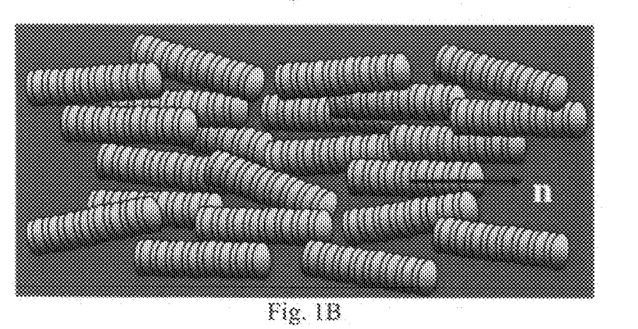
FIG. 1B shows a representation of an elongated aggregate of LCLC molecules.

The hydrophobicity of the aromatic core of the LCLC plays a role in the formation of rod-like aggregates. Hydrophilic ionic groups at the periphery of the molecules make the material water-soluble (see FIG. 1). The aggregates in water solution tend to be parallel to each other and often form the nematic type of liquid crystalline state, labeled N, in which the axes of rods are on average aligned along the same direction called the director, as shown in FIG. 1B.

Cromolyn, with the structural formula shown in FIG. 1A, has been used as an effective anti-asthmatic drug, although there is no clear link between its therapeutical activity and mesomorphic properties. When dissolved in water, cromolyn forms two basic mesomorphic phases, labeled N and M. The intermolecular separation is about 0.34 nm along the axis of aggregate, but it is believed that in the M phase, the aggregates are parallel to each other and arrange into a hexagonal lattice. In the N phase, formed at larger dilutions (shown in FIG. 1B), this lattice disappears but the aggregates retain an orientational order, which makes the N phase similar to a regular nematic phase in thermotropic (solvent-free) materials composed of elongated rod-like molecules.

The details of molecular packing within the LCLC aggregates, including cromolyn, are still debated. (see, for example, G. J. T. Tiddy, D. L. Mateer, A. P. Ormerod, W. J. Harrison, and D. J. Erdwards, Langmuir 11, 390 1995); P. Camorani, M. Furier, O. Kachkovskii, Yu. Piryatinsky, Yu. Slominskii, and V. Nazarenko, Semiconductor Physics, Quantum Electronics & Optoelectronics 4, 229 (2001).) Originally, it was assumed that in cromolyn aggregates, there is one molecule per circular cross-section of the cylinder; the cylinder diameter was estimated to be about 1.6 nm; this value is somewhat smaller than the extended length of the flat cromolyn molecule (which is about 1.9 nm, see FIG. 1). Later, it was proposed that the aggregate is of a hollow square-shaped chimney shape formed by four molecules linked by electrostatic salt bridges. It was further argued that the structure is close to that of regular micelles. Namely, there are four cromolyn molecules in the cross section of the aggregate; these molecules have a shape of a sharp letter V with the OH group at the apex. The OH groups point towards the axis of the cylinder while the eight zwitterionic COONa groups point outward to the water continuum.

Applications have taken advantage of the fact that the structure of LCLC materials in the LC state is orientationally ordered. As the result, the LCLC materials exhibit useful structural and optical properties, such as birefringence, polarization ability, polarization-dependent absorption and polarization-dependent light transmittance, ability to align other materials (such as thermotropic LCs). In most cases, the LC state is used to prepare the LCLC films with uniform alignment through some deposition technique that implies shear. Shear induces specific alignment of the director and thus the structural units (molecules or their aggregates) with respect to the shear direction. Once the aligned structure is created by shear in the LC state, it can be "frozen" by evaporating the solvent. It is important that the shear-induced alignment is especially pronounced when the LCLC material is in the LC state. If the material is too diluted so that it is in the isotropic fluid state during the shear, the alignment is often lost. However, it is important to realize that the final ("dried") state of the material is not necessarily the state that satisfies the thermodynamic definition of the liquid crystalline or mesomorphic state.

In applications as mentioned above, such as polarizing, imaging and optical elements, there has been use of the dried-down films that are not necessarily in their liquid crystalline "mesomorphic" state anymore. Upon drying, the LCLC might display a variety of behaviors, as they might (a) crystallize; (b) form an amorphous solid in which the orientational order is largely preserved or "frozen", the material, however, cannot easily flow; (c) remain in the LC state, either the same state (that was originally prepared by dissolving the LCLC material in solvent) or a different state that exists at lower concentrations of solvent. For example, in case of DSCG, the nematic N phase might transform into the columnar M phase and then into a crystalline state upon drying. Therefore, reference to "evaporated," "dried-down", or "dried" coating refers to coatings prepared from the LC state of LCLC materials in which the excess water (or other solvent) has been allowed to evaporate or has been removed by drying process, but which still retain an equilibrium moisture level typical of the conditions surrounding the sample.

The main feature allowing many LCLC applications in "dried" form is that when water evaporates, the resulting dry film still preserves an orientational order and thus anisotropic optical properties. Preserved in-plane long-range orientational order has been demonstrated not only for films of micron thickness but also for nanofilms comprised of just one or few stacked LCLC monolayers and fabricated by an electrostatic layer-by-layer deposition technique.

Figure 2A:
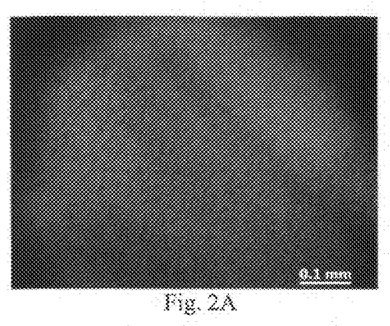
FIG. 2A, FIG. 2B, FIG. 2C, FIG. 2D are images of reference films and sample films according to an example of the present invention showing LCLC textures.
Figure 2B:
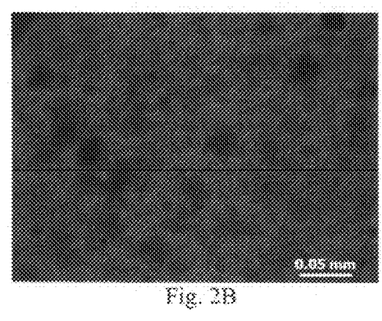
Figure 2C:
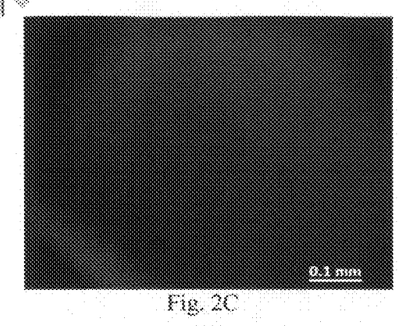
Figure 2D:
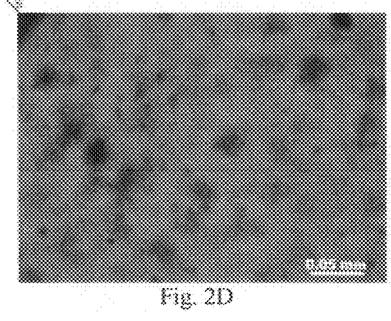

In practical applications of LCLCs, there is a need for a uniform alignment of LCLC materials and the dried films formed from LCLC when water (or other solvent) is evaporated, with the director in the plane of the cell or slightly tilted relative to the plane of the cell. One of the biggest problems in using LCLCs in making such films is that the LCLC director might develop a periodic pattern of distortions, including director variations in the form of sinusoidal lines, that are often called "tiger stripes," "tiger texture" or 'banded' textures because of their characteristic textures under the polarizing microscope between crossed polarizers, as shown in FIG. 2A Because of the director deviation from a unidirectional texture, the optical properties of the resulting dry films are poor.

The director orientation at the substrate may be characterized with reference to two angles. The angle "theta" is the angle between the normal to the substrate and the director. The angle "alpha" is the angle between the director projection onto the substrate and the fixed axis x in the substrate. It has been documented that one of the physical mechanisms of the appearance of "tiger stripes" in nematic liquid crystals is the difference in polar angle "theta" that the director makes with the normal to the top surface of the LC film and the normal to the bottom surface of the LC film. The "tiger stripes" can, in principle, be characterized by modulation of either or both of these angles. However, even when "theta" is constant, for example, "theta"=Pi/2, the stripes can still exist because of the spatial variations of the angle "alpha" characterizing the director distortions in the plane of the substrate. In many applications, it would be desirable that the LCLC, and the dried version of it, align with the angles "alpha" and "theta" being substantially constant across the sample.

Methods for the alignment of thermotropic LCs are known in the art. For example, an attempt uses a substrate coated with a polymer with the polymer layer oriented, for example, by mechanical rubbing. The oriented film then provides an orientation direction for an overlaying thermotropic liquid crystal layer. However, such alignment techniques are not necessarily applicable to lyotropic LCs because of the structural differences between thermotropic and lyotropic LCs. A method of alignment of LCLCs by an aligned polymer layer or by a vapor deposited layer of silicon oxide or a similar compound on a substrate, has been developed, wherein the technique is applicable when the LCLC remains in its dissolved form, i.e. the solvent (water) remains within the sample. It would be desirable to provide alignment of LCLC material in its dried form.

Previously, additives used in the production of thin dried films of the LCLC materials were surfactants, such as Triton X-100, that improve wetting of the LCLC solution on the substrate, salts, such as NaCl, that change the phase diagram of the mesomorphic state of LCLC materials, pH-adjusting additives such as ammonium hydroxide, dyes to change the spectral characteristics of the films, pretilt agents such as Glucopon 225 (available from Henkel Corporation) to provoke a suitable orientation of an adjacent liquid crystal, cross-linking agents to improve chemical resistance of the chromonic materials, and 4-(dimethylamino) pyridine (DMAP), which improves the optical clarity of the liquid crystalline material. However, no previously used dopant has provided a uniform director orientation, and the use of different additives or dopants complicate predictions of chemical and physical properties of the LCLC materials.

Other techniques have also been suggested to impart a desired alignment to LCLCs. For example, it has been suggested to add a non-ionic surfactant to an LCLC, which can then be aligned by photo-treating an azobenzene-containing polymer to align the mixture of surfactant and LCLC. It is also known to align LCLCs in bulk solutions using a strong magnetic field applied to the LCLC cell. However, this field-induced alignment is only temporary as the degenerate (no fixed direction of molecular orientation) orientation returns within tens of minutes once the magnetic field is removed.

Additionally, alignment of LCLC material may be accomplished by depositing alternating layers of polyion and LCLC on a substrate.

Aligned LC material may be used for the creation of polarizing films in liquid crystal displays (LCDs). One of the known techniques of preparing polarizing films is by using water-soluble dye solutions that form LCLCs on glass or polymer substrates. These films are visible to the human eye as they absorb in the visible part of the electromagnetic spectrum. The dyes form liquid crystal phases and tend to orient uniformly during the deposition of the solution on the substrate. However, closer inspection reveals numerous defects in the texture of the resulting film, such as the tiger stripes described above.

There is, therefore, a need to improve the alignment of the LCLC materials, to substantially eliminate the defects such as periodic variations in director orientation and thus to provide for alignment films with improved optical properties, specifically, LCLC-based alignment films that have a more uniform alignment.

SUMMARY

It is, therefore, an aspect of the present invention to provide alignment films with improved optical properties.

It is another aspect of the present invention to provide an alignment film that has improved uniformity of the alignment.

It is still another aspect of the present invention to provide an alignment film that absorbs and transmits light in predetermined ranges of the light spectrum.

It is yet another aspect of the present invention to provide an alignment film that does not display a periodic variation in the director orientation across the film.

The invention also provides methods and apparatus for improving polarization efficiency of dried lyotropic chromonic liquid crystal films by improved molecular alignment of dried lyotropic chromonic liquid crystal mixtures, such as for use as dichroic polarizers and compensating films in ultra-violet, visible and infrared radiation ranges and in liquid crystal displays, optical polarizer or as alignment layers for thermotropic liquid crystals. Improvement in polarization efficiency of significant amounts, such as 10%, are achieved in examples. The highly aligned films of the LCLC materials absorb light with a predetermined polarization within a predetermined part of the electromagnetic spectrum and partially transmit light with another polarization within another part of the spectrum for example. The methods provide for alignment of LCLC materials without any additional dopants and in a simple, cost-effective manner.

The present invention relates to a method for aligning liquid crystalline lytotropic chromonic liquid crystals comprising the steps of forming on a substrate a film having a mixture of one or more lyotropic chromonic liquid crystals and a solvent; applying a shear stress to the film; allowing the film to dry, and evaporating the solvent. The shear stress is applied using a shearing device having a shearing tool and a repelling pad or layer. The repelling pad may be made from a material capable of repelling a solvent used to dissolve the lyotropic chromonic liquid crystal material.

The present disclosure also relates to an apparatus for aligning liquid crystalline lyotropic chromonic liquid crystals comprising a film containing one or more lyotropic chromonic liquid crystals and a solvent; a substrate for receiving the film containing the lyotropic chromonic liquid crystals and the solvent; a shearing tool for applying a shear stress to the film; and a repelling pad.

BRIEF DESCRIPTION OF THE DRAWINGS

The patent or application file contains at least one drawing executed in color. Copies of this patent with color drawing(s) will be provided by the Patent and Trademark Office upon request and payment of necessary fee.

For a complete understanding of the present invention, reference is made to the following detailed description and accompanying drawings, wherein.

DETAILED DESCRIPTION OF THE DRAWINGS

The present invention is directed toward alignment films and methods and devices that may prepare aligned films from the liquid crystalline state of Lyotropic Chromonic Liquid Crystal (hereinafter referred to as "LCLC"). The films may possess a substantially uniform director orientation as a result of a mechanical shear imposed thereon, such as by using a shearing device according to the invention. The shearing device may improve the uniformity of the director alignment and thereby reduce or eliminate formation of defects such as tiger stripes caused by a periodic director orientation variation across the sheared film, or other periodic variations or nonuniformities in the alignment structure.

Figure 1C:
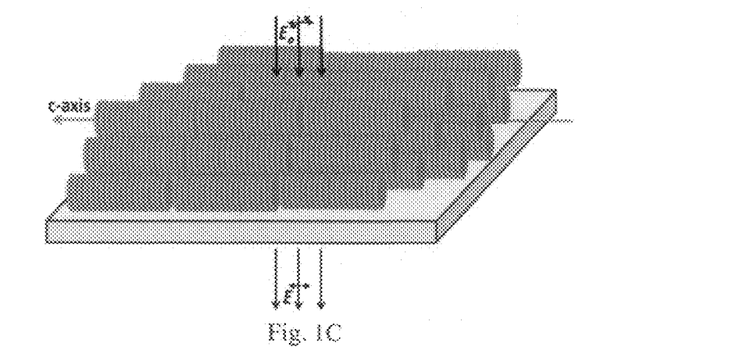
FIG. 1C shows a representation of a nematic phase formed by the solution of LCLC columnar aggregates.

As mentioned above, LCLC materials, for example, the DSCG molecules 10 shown in FIG. 1, have a molecular structure that includes a relatively rigid plank-like or disc-like aromatic core 12 with polar solubilizing groups 14 attached to the core 12 and lying along its periphery. The plank-like or disk-like LCLC molecules form columnar aggregates 16 (FIG. 1B) by stacking face-to-face rigid aromatic cores. Within a certain concentration of LCLC molecules in the solvent, the aggregates tend to be parallel to each other and often form the nematic type of liquid crystalline state. The axes of columnar aggregates are on average aligned along the same direction, referred to as the director, as seen in FIG. 1C.

In one embodiment, the LCLC molecules may be summarized by formula I below.

(R1)a(R2)b(R3)cAr1-Xg-Ar2(R4)d(R5)e(R6)f     (I)

In formula I, Ar1 and Ar2 are the same or different aromatic groups, X is one or more of a bond, —NH—, —N=N—, C1-C8 alkyl, C1-C8 hydroxyalkyl, C1-C8 alkyloxy, an imidazole, a non-heterocyclic aromatic group or a substituted non-heterocyclic aromatic group, R1-R6 are each independently a sulfite, a salt of a sulfite, a carboxyl, a salt of a carboxyl, a C1-C4 alkyl, an alkylamine, =O, or a halogen, a, b, c, d, e, and f are independently 0-2 and g is 1 or 2. In one particular example, Ar1 and Ar2 are independently selected from the group consisting of benzene, naphthalene, anthracene, benzimidazole, anthraquinone and benzopyran. In another example, Ar1-X—Ar2 together form perylene or a substituted perylene. It is envisioned that suitable LCLC materials include Violet 20, Blue 27, cromolyn, Red 14, C.I. Direct Blue 67, Methyl Orange, Sirius Supra Brown RLL, RU31156, Copper-tetracarboxyphthalocyanine, Cyanine dye, C.I. Acid Red 266, C.I. Direct Red 1, C.I. Direct Red 2, C.I. Direct Red 28, C.I. Acid Red 151, Tartrazine, Quinacrine, C.I. Direct Brown 202, C.I. Acid Orange 2, Reactive Red 3:1, and sodium and ammonium salts of perylenetetracarboxylic bisimides.

While not bound to any particular theory of operation, it is believed that the mechanically sheared layer of LCLC material according to the invention as will be described, facilitates alignment of the LCLC materials. The mechanical shear may establish a planar orientation at the bottom and the top surfaces of the liquid crystal film.

Previous attempts have not necessarily provided a uniform orientation, forming nonuniformities such as characterized by an appearance of "tiger stripes" texture as observable under a polarizing microscope between crossed polarizers. Such nonuniformities are seen in FIGS. 2A and 2B, FIGS. 4A and 4B, and FIGS. 7A and 7B for example. The tiger stripes texture may be formed by waving aggregates after their structure was pulled and then released by applied shearing force. The drying of the film then freezes any nonuniformities into the film. To prevent such nonuniformities, uniform application of a shear force to align the LCLC materials and uniform drying and any associated shrinking of the film is provided. Uniform drying is provided by use of uniform coverage on the surface of the substrate, and making the substrate solvent friendly. For example, for water based LCLC materials, a clean glass substrate may be used, which has a hydrophilic character. For other types of LCLC materials and solvents, other substrate materials may be used appropriately, such as plastic or other polymeric materials for example. To provide uniform shear forces to the LCLC materials, the shearing device according to the invention, as will be described hereafter, may also have the desired characteristics, such as being made of a soft hydrophobic material or other suitable materials. For example, materials such as glass or metal shearing devices may be hydrophilic and therefore apply shear to the mass of water based LCLC materials, which although potentially providing coverage of the LCLC materials and solvent on the substrate, tend to cause attachment of the columnar aggregates to the shearing device, and provide relatively high pulling strength applied to the aggregates during shearing of the LCLC material, which can cause the nonuniformities that are not desired. A hydrophobic or other repelling material, by repelling the LCLC materials, may improve uniformity of aligned LCLC films upon application of the shearing force thereby. Such a feature avoids the high pulling strength applied to the film upon shearing. The arrangement of the shearing device thus provides a uniform orientation, characterized by a lessening or even elimination of "tiger stripes" formation as observed under a polarizing microscope between crossed polarizers as shown in the reference films, such as shown in the reference examples of FIGS. 2C and 2D, FIGS. 4C and 4D, and FIGS. 7C and 7D.

Figure 9:
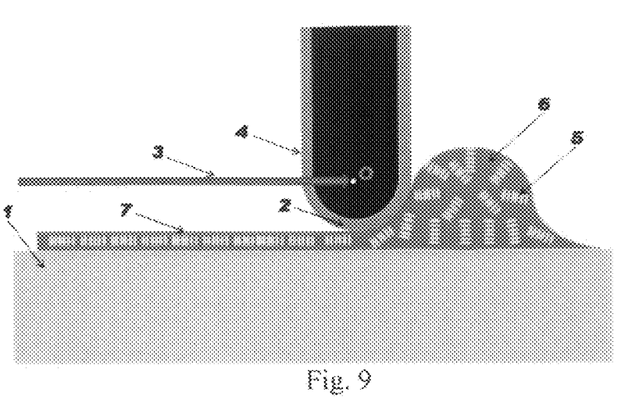
FIG. 9 is an illustration of an example shearing device.
Figure 10:
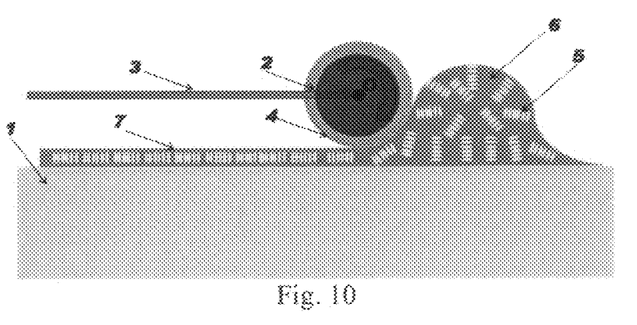
FIG. 10 is an illustration of an example shearing device.

FIGS. 9 and 10 show examples of shearing devices that may be used to shear the LCLC mixture into a thin layer. The shearing device may be comprised of a shearing tool 2 and a repelling pad 4. The shearing tool 2 may be constructed from glass, plastic, metal or other suitable material. In the example shearing device configuration, the shearing tool is a metal blade or a glass rod. However, the shearing tool is not limited to this particular configuration, and may be constructed from any material known to one of ordinary skill in the art, and may take different forms to achieve the same function regarding application of the shear force to the film. The repelling pad or layer 4 may be selected from the group consisting of materials having properties that repel LCLC from the mass of the solvent used to dissolve the LCLC material. For example, hydrophilic materials such as glass or metal, or hydrophobic materials, including, but not limited to cured silicone elastomer, may be used to construct the repelling pad. One example of the repelling pad or layer is a silicone elastomer such as Sylgard 182 or Sylgard 184 (Dow Corning Corporation, Midland, MI).

The aligned film of LCLC may be formed by mixing the LCLC material with a solvent. The solvent may be chosen according to the desired physical properties of the LCLC material. A substrate 1 is provided as shown in FIG. 9 and FIG. 10, and the mixture 6 containing the columnar aggregates of LCLC material 5 and solvent may be placed on the surface of the substrate 1. The mixture of columnar aggregates may be aligned by applying a shear force with the shearing device. The shearing device may be moved in the lateral direction depicted by the arrow 3. The shearing force may be applied manually or a motor may be attached to the shearing device in order to drive the shearing device in the lateral direction. In an automated process, the shearing device may have dimensions to correspond to the substrate 1 on which the film is to be provided, and will automatically apply shearing force to the film after application to the substrate 1. As the shearing device laterally moves across the surface of the substrate 1, the repelling pad 4 aligns the columnar aggregates 5 inside of the thin aligned layer 7. After the LCLC mixture has been sheared, the solvent may be allowed to dry out from the aligned layer 7 of LCLC mixture. A dried film of aligned LCLC material remains on the substrate 1.

In the example of FIG. 9, the shearing device may be formed of a doctor blade 2, which is a generic term for any steel, rubber, plastic, or other type of blade used to apply or remove a liquid substance from another surface, such as those blades used in coating paper, in gravure and other printing processes and other applications. The doctor blade 2 may have a curved end and be covered with a repelling pad or layer. The trajectory in which the center of curvature of the doctor blade moves is parallel to the substrate 1. The doctor blade 2 is formed to be straight, so as to ensure consistent scraping pressure across the width of the substrate 1. The doctor blade 2 may be fixed firmly in place by a doctor blade holder assembly (not shown), the amount of blade protruding from the holder being known as the blade extension. The doctor blade 2 is shown to be at ninety degrees to the substrate 1, with the angle at which the blade contacts the substrate 1 is referred to as the contact angle, which can be varied. The contact angle also affects the distance between the blade and the nip between the substrate 1. If desired, the doctor blade can be made to oscillate across the width of the substrate as a means of providing uniform application of shear force to the film material 5. The contact angle and blade pressure should take into account deflection if the blade 2 is large. The edge of the blade 2 may be in a variety of configurations. If desired, a pre-wiping blade can be located between the application of the LCLC material 5 to the substrate and the doctor blade 2, which is set close to the substrate 1, but which does not contact it, to slough off excess material 5 before the doctor blade 2 applies shear force thereto. As seen in FIG. 9, upon application of the shear force to the material 5, the mass of LCLC mixture 6 is formed into an aligned layer of LCLC material 7.

In FIG. 10, the shearing device may be formed as a rotating bar 2, which also may be made of steel, rubber, plastic, or other type of material. The device 2 may have a circular configuration and be covered with a repelling pad 4. The trajectory in which the center of curvature of the device 2 moves is parallel to the substrate 1. The device 2 is formed to be straight, so as to ensure consistent scraping pressure across the width of the substrate 1. The device 2 may be fixed firmly in place by a holder assembly (not shown) that also imparts rotation to the bar. The device 2 is shown to be parallel to the substrate 1, and is moved and rotated parallel to the substrate 1. If desired, the device can be made to oscillate across the width of the substrate 1 as a means of providing uniform application of shear force to the film material 5. If desired, a pre-wiping blade can be located between the application of the LCLC material 5 to the substrate and the device 2, which is set close to the substrate 1, to slough off excess material 5 before the doctor blade 2 applies shear force thereto. As seen in FIG. 10, upon application of the shear force to the material 5, the mass of LCLC mixture 6 is formed into an aligned layer of LCLC material 7.

Figure 11A:
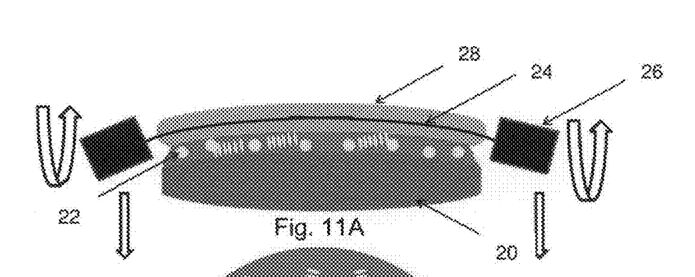
FIG. 11A and FIG. 11B are side and top views respectively of an alternate embodiment of a shearing device.
Figure 11B:
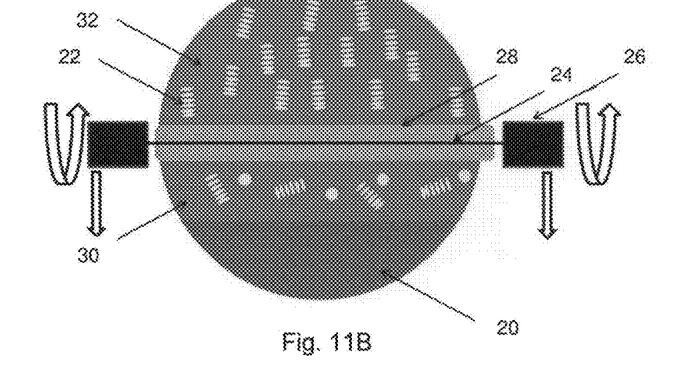
Figure 12:
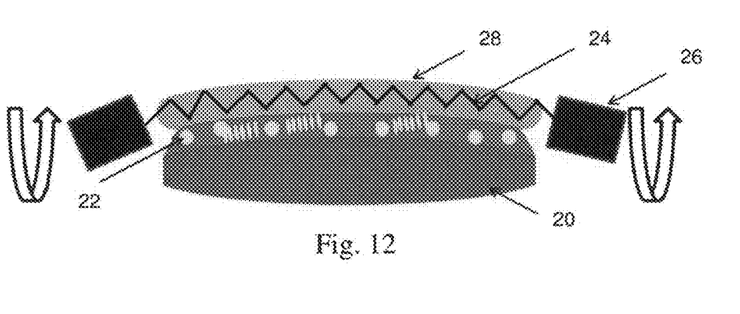
FIG. 12 is a side view of an alternate embodiment of a shearing device.

For some applications, such as in liquid crystal displays (LCDs), the substrates used are not planar. FIG. 11 and FIG. 12 show alternate embodiments of a shearing device for use where the surface of the substrate 20 may have a curved profile. For example, the substrate 20 may be a spherical lens made of glass or the like. When the substrate 20 has a curved profile, the shearing tool 24 may be constructed from a flexible article such as a string or a spring as shown in FIGS. 11A and B and FIG. 12 respectively. The string or spring 24 may have a flexible repelling pad 28 to apply shear force to the LCLC material on the substrate 20. In these alternate embodiments, the flexible shearing device is capable of shearing along the curved profile of the substrate 20. The spring or string 24 may be attached to a holder 26 and be attached to a motor in order to drive the shearing device and provide a shearing force to the LCLC mixture 30 including columnar aggregates 22. The LCLC mixture is sheared in the same manner as described above to form a sheared layer of LCLC mixture 32, and the solvent is allowed to evaporate. After the solvent evaporates, the dried layer of aligned LCLC remains on the substrate having the curved profile.

In the shearing devices according to the invention, a hydrophobic material may be used as a repelling pad or layer in the examples above. Such a material, by repelling the water based LCLC materials, may improve uniformity of aligned LCLC films upon application of the shearing force thereby. Such a feature avoids the high pulling strength applied to the film upon shearing. Additionally, the repelling nature of the shearing device may cause a temporal excess of solvent from the thin layer of sheared LCLC, and facilitate the deposition of aligned aggregates on the surface of the substrate. Further, the repelling nature of the shearing device may minimize any potential for scratching the film of substrate. The shearing device may also be formed to have a repelling pad or layer, made of softer materials, and smoothed surfaces, resulting in the sheared LCLC film having better uniformity in both thickness and molecular alignment.

In order to demonstrate the practice of the present invention, the following examples are provided. In the examples, the preparations of films based on disodium cromoglycate (DSGC), neutral gray dye NO15, and IR-806 dyes are described respectively for three spectral ranges: ultra-violet, visible, and near-infrared. In provided examples, the samples of aqueous solutions LCLC materials were sheared by using a shearing device comprising a glass bar covered with a hydrophobic materials such as a silicone elastomer, such as Sylgard 182 or Sylgard 184 (Dow Corning Corporation, Midland, MI). For example, the silicone elastomer is provided in a repelling pad having a thickness of approximately 0.5-10 mm. These examples should not be viewed as limiting the scope of the invention. These silicone elastomers are hydrophobic, and based on a mixture of Dimethyl, methylhydrogen siloxane: dimethyl siloxzane, dimethylvinyl-terminated; Dimethylvinylated and trimethylated silica; tetramethyl tetravinyl cyclotetrasiloxane; and Ethylbenzene. The silicone elastomers or other hydrophobic materials, may be applied to the doctor blade or other shearing device as described in a suitable manner. The examples hereafter are not intended to limit the invention, and the claims define the scope of the inventions.

EXAMPLE 1

FIG. 1 shows the molecular and macrostructure of disodium cromoglycate (DSCG). The structure of DSCG may be generally disk-like, rigid and aromatic. The DSCG molecules may have a relatively rigid plank-like or disc-like aromatic core with polar solubilizing groups at the periphery. The aggregation of DSCG molecules may be caused by face-to-face arrangement of the aromatic cores, which usually results in one or more columnar aggregates. The columnar aggregates in a water solution tend to be parallel to each other and often form nematic type liquid crystalline state, in which the axes of columnar aggregates are on average aligned along the same direction called the director, as shown in FIG. 1B. The aggregates in the nematic phase may be oriented by using shear forces on a surface of a substrate.

With reference to FIG. 2, to prepare a nematic mixture of DSCG in water, 1.4 g of DSCG was dissolved in 8.6 g of deionized water. The DSCG mixture may be deposited onto a substrate, such as a clean glass substrate, using any technique known in the art. A shearing device such as described above may be used to apply a shear force to the DSCG film. For example, two types of glass bars were used as shearing tools. A clean glass bar was used to form the reference films of FIGS. 2A and 2B, while a glass bar covered with a layer of silicone elastomer, Sylgard 182, was used to form the films of FIGS. 2C and 2D. After the DSCG film of each example was sheared, the solvent was allowed to dry or evaporate at room temperature. More particularly, the examples used DSCG (CAS: 15826-37-6) available from Spectrum Chemical MFG. Corporation (New Brusnwick, NJ, USA). The films were fomed on Fisherfinest premium microscope plain glass slides made in the USA of Swiss Glass (Fisher Scientifice, USA). The resulting DSCG film may be examined between crossed polarizers under a polarizing microscope. The small diagrams shown the orientation of the polarizer (P) and analyzer (A) of the polarized microscope and the shearing direction (S). As shown in FIGS. 2A and 2B, in a film from a DSCG solution deposited on a substrate with shearing using a glass rod without silicone elastomer repelling pad, the "tiger stripes" are evident. As shown in FIGS. 2C and 2D, in a film from a DSCG solution deposited on a substrate and sheared using the shearing device with repelling pad, the tiger stripes are not evident.

EXAMPLE 2

FIG. 4 shows an example of a film formed from an aqueous solution of Neutral Gray dye NO15 (Optiva, California) applied to a substrate and sheared using the shearing device described above. The aqueous solution of Neutral Gray dye NO15 in this example had a weight concentration of dye in the aqueous solution of about 15%. The reference films of NO15 dye of FIGS. 4A and 4B were prepared and sheared using the shearing tool without a repelling pad. A sample film of NO15 dye may be prepared and sheared according to the method described above, using a shearing device with repelling pad, as shown in FIGS. 4C and 4D. The small diagrams show the orientation of the polarizer (P) and analyzer (A) of the polarized microscope and the shearing direction (S). The films were allowed to dry in normal humidity at room temperature, and each had a thickness of approximately one micron. The reference film shown in FIGS. 4A and 4B shows the presence of "tiger stripe" texture, while the films of FIGS. 4C and 4D are free of the "tiger stripes" texture.

EXAMPLE 3

FIG. 7 shows a layer of Infrared dye IR-806 (Sigma-Aldrich Corp., St. Louis, MO) applied to a substrate and sheared using the shearing device described above, without and with a repelling pad as described. The reference film of FIGS. 7A and 7B was sheared using the shearing tool without a repelling pad, similar to the one used in Example 2. The IR-806 film of FIGS. 7C and 7D was sheared using the shearing tool covered with the repelling pad. The reference film and IR-806 film may be placed between crossed polarizers in polarized microscope to check the alignment of the films. The microscope image of the reference film contained "tiger stripes," as shown in FIGS. 7A and 7B, with the shearing direction (S) being parallel to the linear polarization of light after the polarizer (P) in the polarized microscope as in FIG. 7A and the same with shearing direction tilted on 45 degrees in FIG. 7B. In contrast, the IR-806 film sheared with the shearing tool and repelling pad was highly aligned and had no tiger stripes as shown in FIG. 7C with shearing (S) parallel to polarizer (P), and shearing (S) tilted at 45 degrees in FIG. 7D.

Figure 8A:
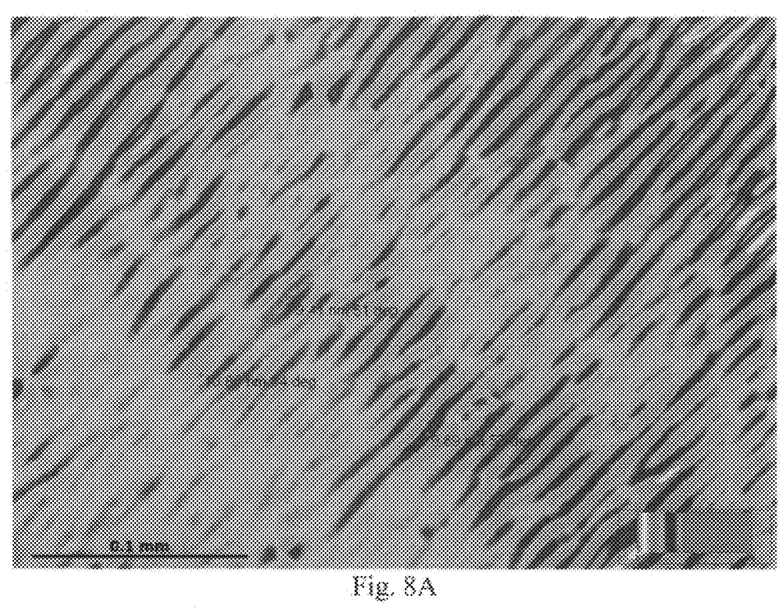
FIG. 8A and FIG. 8B are pseudo color images of reference films and sample films according to an example of the present invention showing LCLC molecular orientation.
Figure 8B:
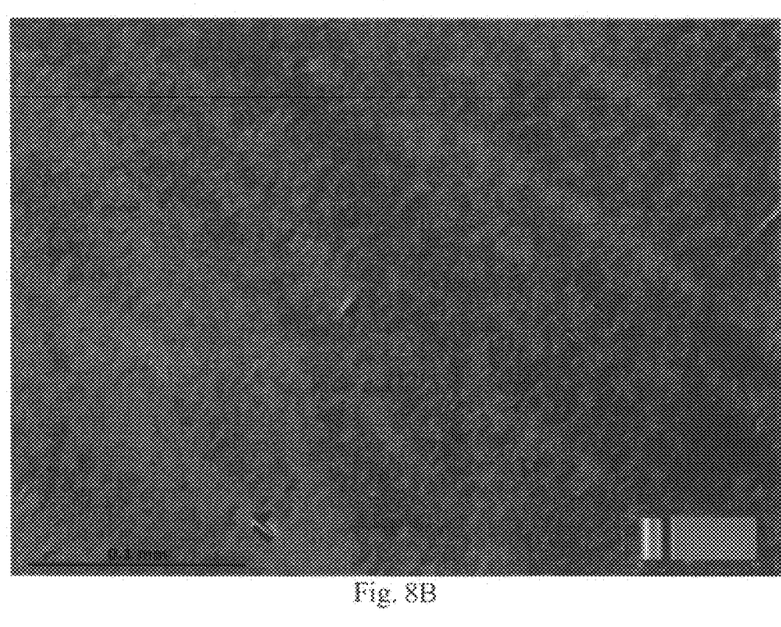

The uniformity of the IR-806 film may also be tested by processing textures in Polscope imaging system, as shown by FIG. 8A and FIG. 8B. The pseudo color map of the molecular orientation in the reference film indicates the repeating variation of the angular orientation in the range of 34 to 57 degrees. In contrast, the molecular alignment of the film sheared with the shearing tool and repelling pad was uniform having a calculated angle of molecular orientation of 45 +/−2 degrees.

Figure 3A:
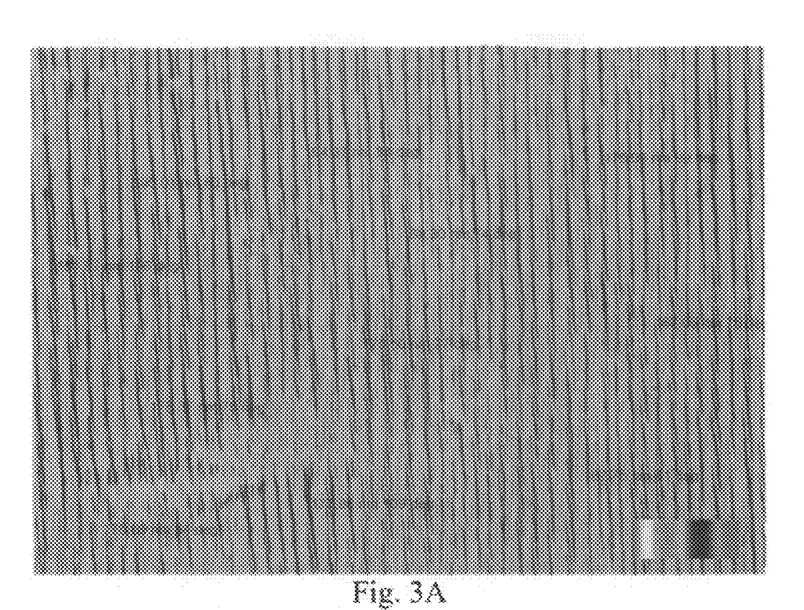
FIG. 3A and FIG. 3B are pseudo color images of reference films and sample films according to an example of the present invention showing LCLC molecular orientation in the example films according to the invention showing LCLC textures.
Figure 3B:
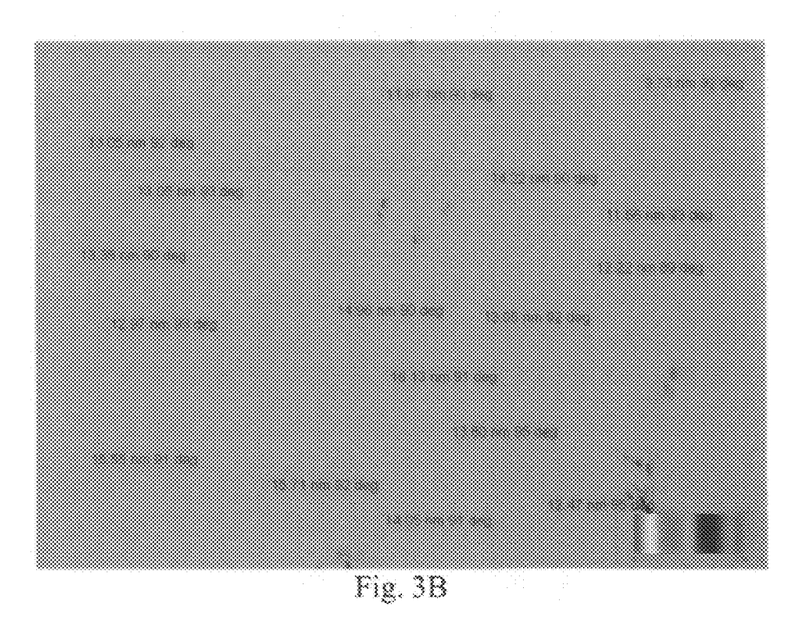
Figure 4A:
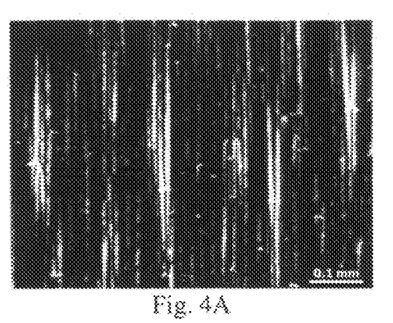
FIG. 4A, FIG. 4B, FIG. 4C, FIG. 4D are images of reference films and sample films according to an example of the present invention showing LCLC molecular orientation.
Figure 4B:
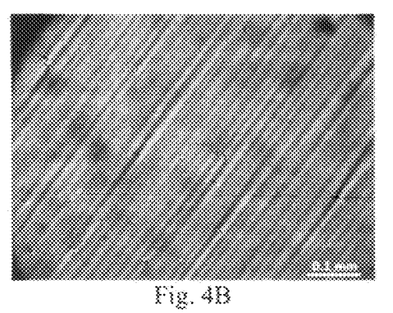
Figure 4C:
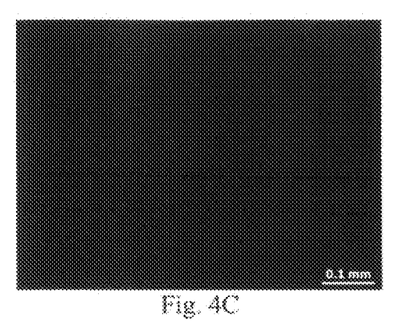
Figure 4D:
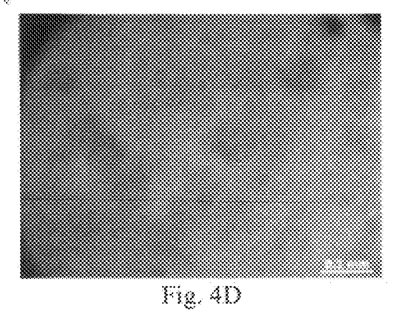
Figure 5A:
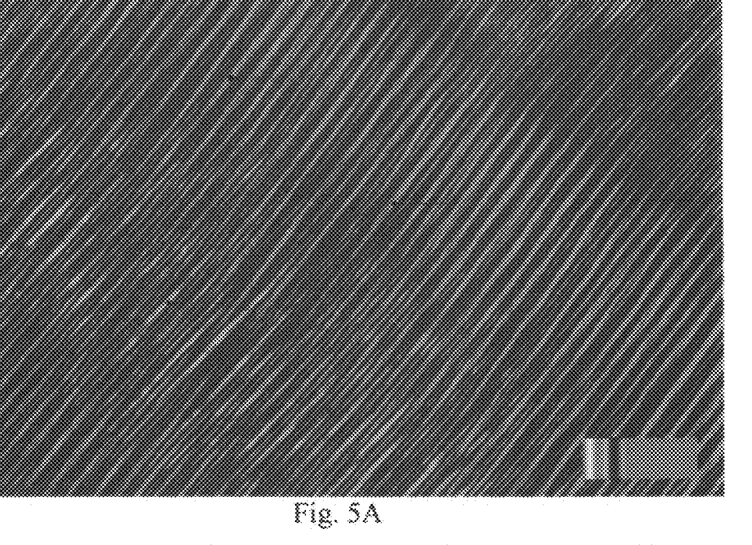
FIG. 5A and FIG. 5B are pseudo color images of LCLC molecular orientations of reference film and sample film according to an example of the invention.
Figure 5B:
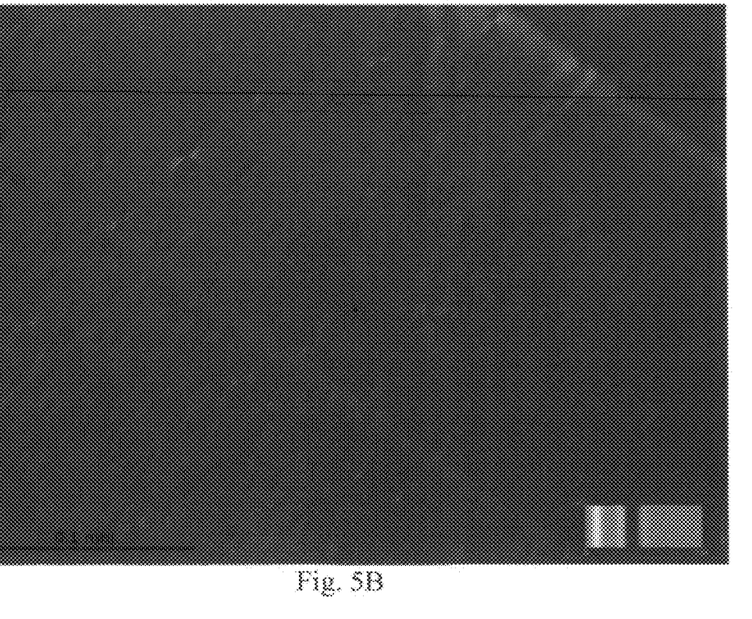

The optical properties of each reference film and sample film as described above in the three examples may be tested and compared using a polarized microscope (Ocean Optics Spectrometer USB2000 and Polscope imaging system). FIGS. 3, 5 and 8 show pseudo color images of LCLC molecular orientation of the alignment of the reference films and sample films prepared according to the three examples described above. FIG. 3A shows the pseudo color image of LCLC molecular orientation of the reference film while FIG. 3B shows the pseudo color image of LCLC molecular orientation of the sample film sheared using the shearing tool covered with the repelling pad (Sylgard 184 pad). In the processed pseudo color image of the molecular orientation of the reference film in FIG. 3A, the repeating variation of nonuniformities in the film is clearly seen as a striped sequence of different color, and the angular orientation varied from 41 to 61 degrees. In contrast, the molecular alignment of the sample film sheared with a device with repelling pad (Sylgard 184) is uniform, except for defects caused by mechanical scratching. The calculated angle of molecular orientation was 78 degrees. Small color diagrams at the bottom right of each image show scales of the pseudo colors vs. angle of orientation.

Figure 6A:
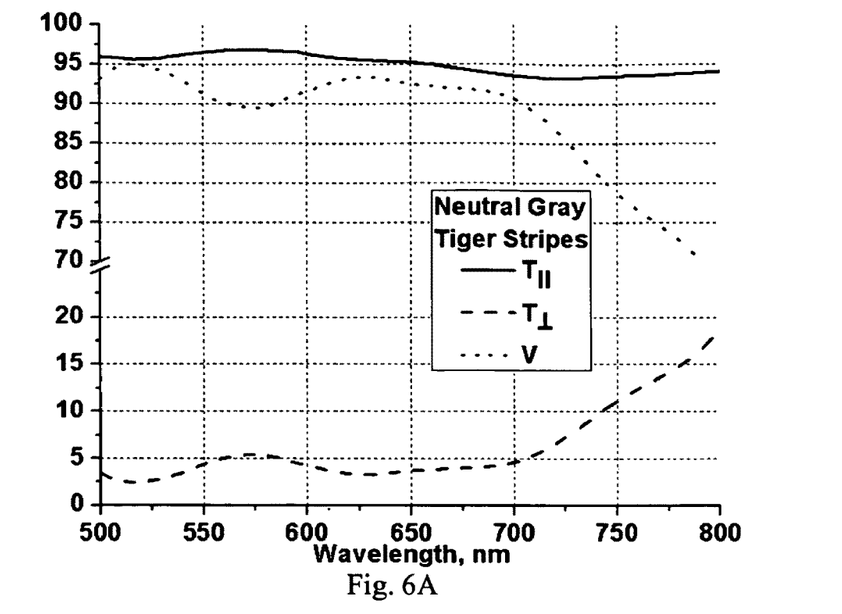
FIG. 6A and FIG. 6B are graphical representation spectra of transmissions and polarization efficiency measured for the linearly polarized light along and orthogonal to shearing directions of reference and sample films.
Figure 6B:
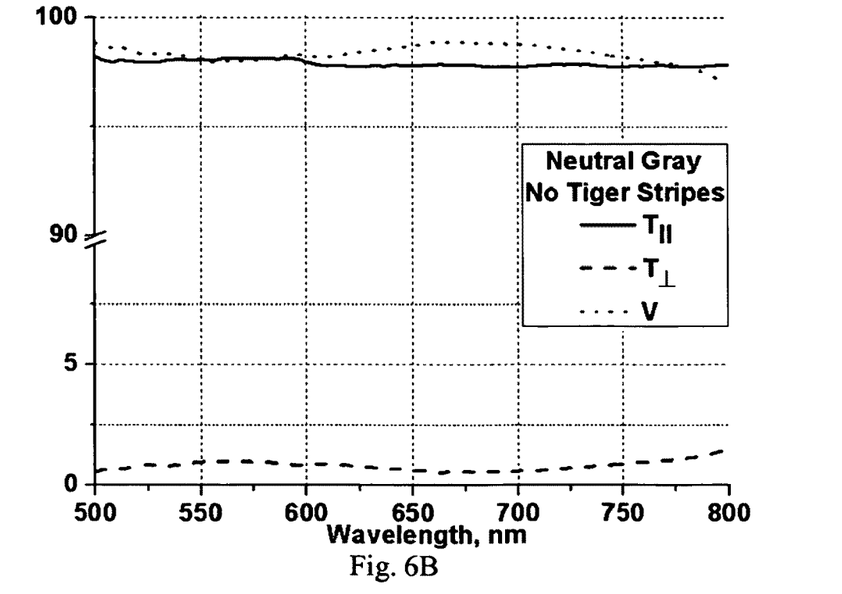
Figure 7A:
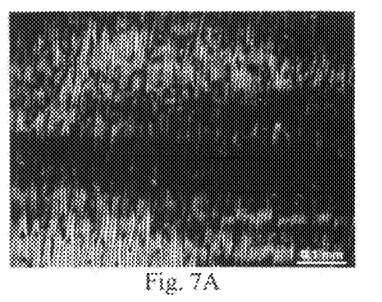
FIG. 7A, FIG. 7B, FIG. 7C and FIG. 7D are images of reference films showing "tiger stripe" texture of the reference films and sample films according to an example of the invention.
Figure 7B:
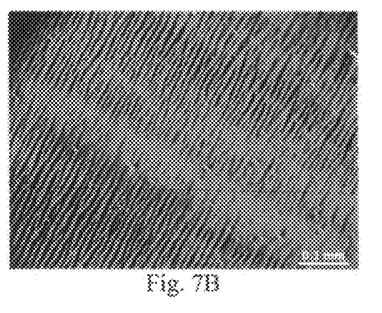
Figure 7C:
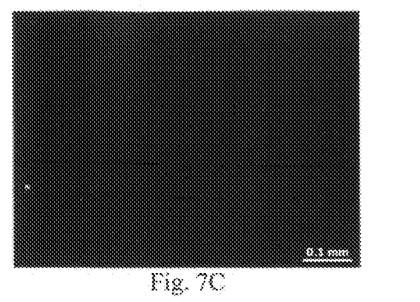
Figure 7D:
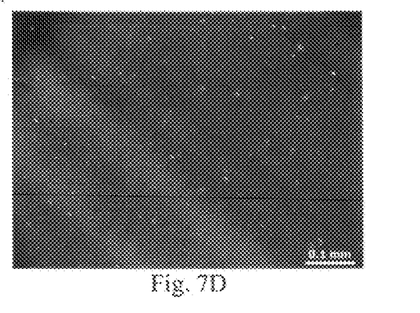

Spectral measurements of the transmission T of the dried films was performed using a spectrometer (Ocean Optics USB2000), with a wavelength resolution of 0.4 nm. Spectra of transmission were measured by detecting to intensity of transmitted linearly polarized light along parallel and orthogonal directions to the shearing direction (S). The experimental data were used to plot the spectra of transmission T and polarization efficiency V vs. wavelength, where the polarization efficiency was calculated as V=(Tmax −Tmin/Tmax +Tmin)100%. FIG. 6 shows transmissions and polarization efficiencies of the reference and sample films as described above in Example 2. It is noted that both films have a high transmission for the linearly polarized light with polarization parallel to the shearing direction. In the orthogonal direction, the transmission of the sample film is lower than the one of the reference film. For example, in the spectral range from 500 to 800 nm, the orthogonal transmission was 3-5% for the reference film, and less than 2% for the sample using the repelling pad in the shearing operation. As a result, in the same spectral range, the homogenously aligned sample film has the highest values of the polarization efficiency as compared to the "tiger striped" reference film, being 98-99% and 9095% respectively. The spectrometer (Ocean Optics USB2000) may also be used to measure the absorbance of each reference film and sample film as described above in the three examples. Using data of absorbencies in both parallel and orthogonal directions, the order parameter of the aligned structure of the LCLC film was evaluated. Within the spectral range of the highest absorbance from 500 to 650 nm, the sample file had a higher value of the order parameter (S=0.725 as compared to the reference film S=0.65, where S=N-1/N+2 where N=Amax/Amin, Amax=A(wavelength of maximum absorbencies for orthogonal direction) and Amin=A(wavelength of maximum absorbencies for parallel direction).

Based upon the foregoing disclosure, it should now be apparent that the shearing device as described above may be used to align LCLC materials as set forth hereinabove. It is, therefore, to be understood that any variations evident fall within the scope of the claimed invention and thus, the selection of specific component elements can be determined without departing from the spirit of the invention herein disclosed and described.

What is claimed is:

1. An apparatus for aligning liquid crystalline lyotropic chromonic liquid crystals comprising:
   a film containing one or more lyotropic chromonic liquid crystals and a solvent;
   a substrate for receiving the film containing the lyotropic chromonic liquid crystals and the solvent;
   a shearing tool for applying a shear stress to the film; and
   a repelling layer.

2. The apparatus according to claim 1, wherein the repelling layer is made from a material capable of repelling a solvent used to dissolve the lyotropic chromonic liquid crystals.

3. The apparatus according to claim 1, wherein the shearing device further comprises a motor attached to the shearing tool.

4. The apparatus according to claim 1, wherein the shearing device and substrate move substantially parallel to one another.

5. The apparatus according to claim 1, wherein the shearing tool is selected from the group consisting of a bar, a rod, a blade, a string, or a spring.

6. The apparatus according to claim 1, wherein the repelling layer is made from a hydrophobic material.

7. The apparatus according to claim 1, wherein the repelling layer is made from a hydrophilic material.

8. A method of forming an aligned film of a lyotropic chromonic liquid crystal material comprising the steps of:
   forming on a substrate a film having a mixture of one or more lyotropic chromonic liquid crystals and a solvent;
   shearing the mixture of one or more lyotropic chromonic liquid crystals using a shearing device having a repelling material, and
   evaporating the solvent from the mixture of one or more lyotropic chromonic liquid crystals.

9. The method of claim 8, further comprising the step of allowing the film to dry at room temperature.

10. The method of claim 8, wherein the film does not exhibit a periodic direction orientation variation across the film.

11. The method of claim 8, wherein the repelling material is made from material capable of repelling a solvent used to dissolve the lyotropic chromonic liquid crystal material.

12. The method of claim 8, wherein the lyotropic chromonic liquid crystal material is dissolved in the solvent.

13. The method of claim 8, wherein the shearing device and surface of the substrate move substantially parallel to one another.

14. The method of claim 8, wherein the aligned film comprises a molecular alignment of the mixture of the one or more lyotropic chromonic liquid crystals.

15. The method of claim 8, further comprising the step of attaching a motor to the shearing device.

16. A method for aligning liquid crystalline lytotropic chromonic liquid crystals comprising:
   forming on a substrate a film having a mixture of one or more lyotropic chromonic liquid crystals and a solvent;
   applying a shear stress to the film using a shearing device including a tool with a repelling layer;
   allowing the film to dry, and
   evaporating the solvent.

17. The method according to claim 16, wherein the repelling layer is made from a material capable of repelling a solvent used to dissolve the mixture of one or more lyotropic chromonic liquid crystal material.

18. The method according to claim 16, further comprising the step of attaching a motor to the shearing device to provide the shear stress.

19. The method according to claim 16, wherein the shear stress is applied in a direction parallel to the substrate.

* * * * *